United States Patent Office
3,343,632
Patented Sept. 26, 1967

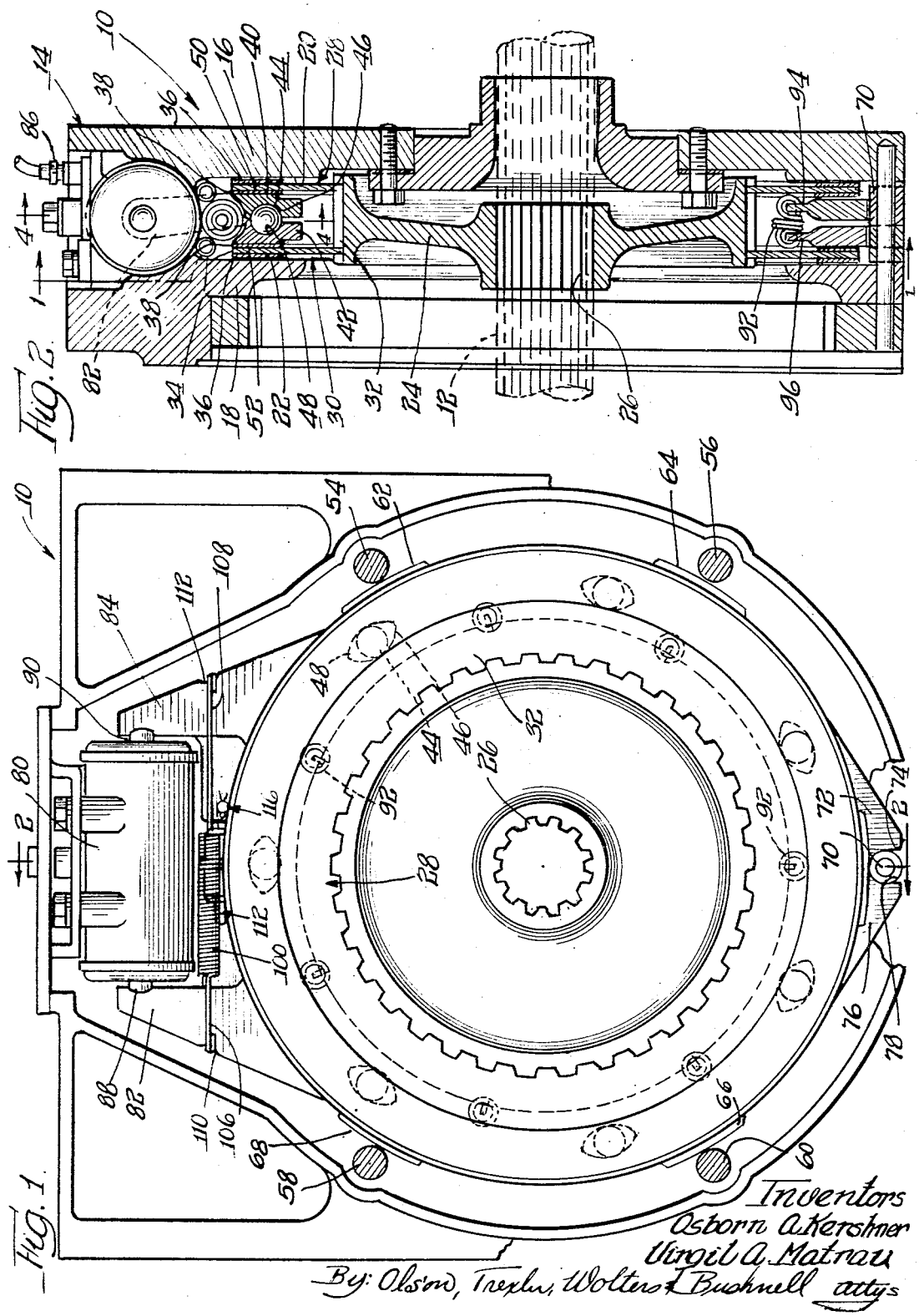

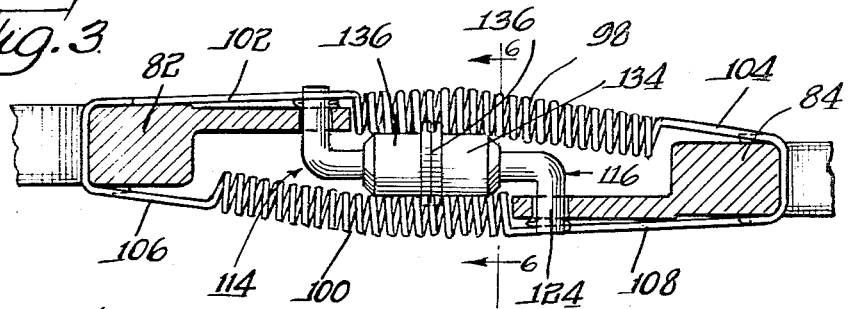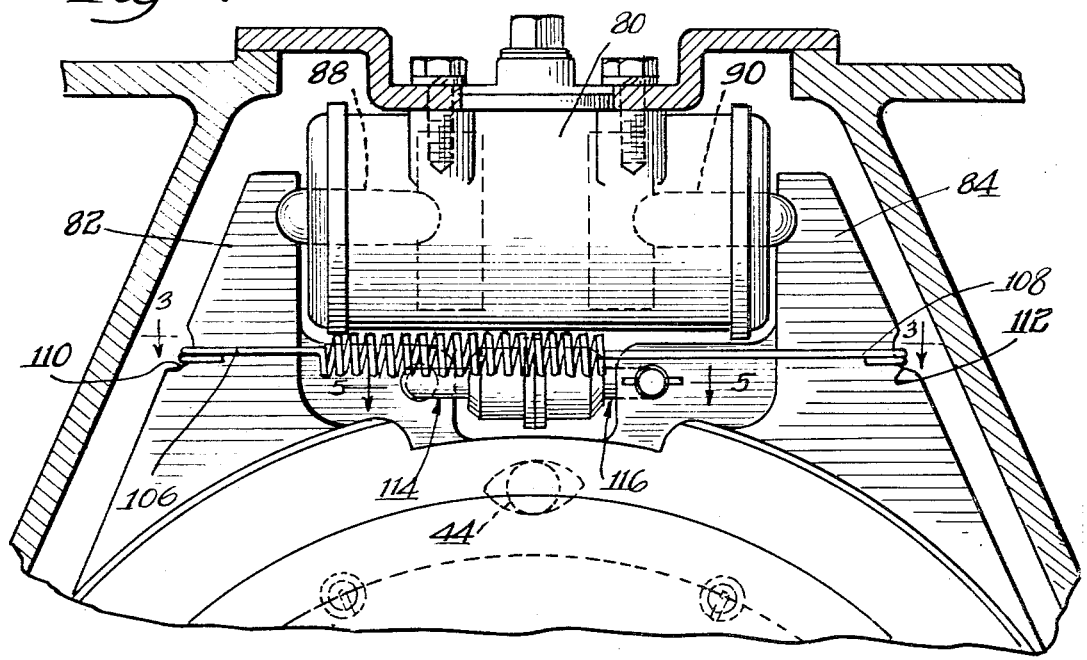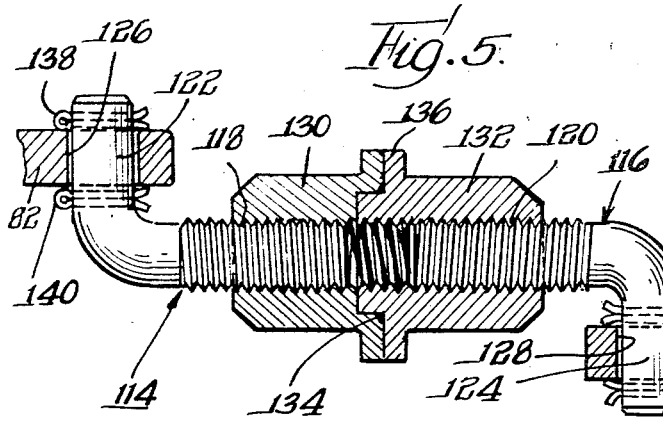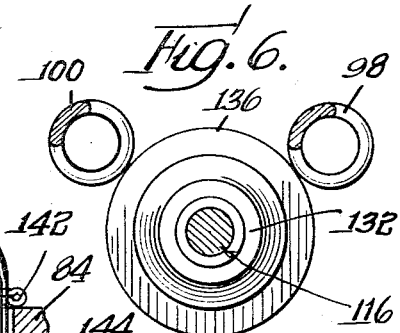

3,343,632
SELF-ADJUSTING DISC BRAKE
Osborn A. Kershner, St. Joseph, and Virgil A. Matrau, Benton Harbor, Mich., assignors, by mesne assignments, to Lambert Brake Corporation, St. Joseph, Mich., a corporation of Michigan
Filed July 12, 1965, Ser. No. 471,108
2 Claims. (Cl. 188—72)

The present invention relates to a novel friction device, and more specifically to a novel friction brake unit.

Brake units have been proposed which, in general, contemplate the inclusion of a pair of relatively shiftable or rotatable members adapted to be actuated for urging one friction surface against another friction surface. As is known, the friction surfaces tend to wear away during use so that the clearance therebetween increases unless some means is provided for adjusting the initial or starting relative position of the aforementioned members for compensating for the wear.

An important object of the present invention is to provide a novel disc type friction brake unit having means for compensating for wear of the friction surfaces.

A more specific object of the present invention is to provide a novel disc type friction brake having a pair of relatively rotatable actuating discs and means extending therebetween for automatically adjusting the initial or starting relative position of the discs in order to compensate for wear.

A further specific object of the present invention is to provide a novel friction brake incorporating a pair of energizing discs and fluid pressure actuating means extending between said discs.

A further object of the present invention is to provide a novel brake structure of the above described type which is of relatively simple, effective and rugged construction.

Other objects and advantages of the present invention will become apparent from the following description and the accompanying drawings wherein:

FIG. 1 is a sectional view taken generally along line 1—1 in FIG. 2;

FIG. 2 is a sectional view taken along line 2—2 in FIG. 1;

FIG. 3 is a fragmentary partial sectional view taken generally along line 3—3 in FIG. 4;

FIG. 4 is an enlarged fragmentary partial sectional view taken generally along line 4—4 in FIG. 2;

FIG. 5 is a further enlarged fragmentary partial sectional view taken generally along line 5—5 in FIG. 4; and FIG. 6 is an enlarged sectional view taken along line 6—6 in FIG. 3.

A brake unit 10 incorporating features of the present invention is shown in FIGS. 1 and 2 and may be adapted for controlling a variety of rotatable members such as a rotatable shaft 12. As will be understood, the shaft 12 may be a wheel axle or other rotatable shaft in a variety of vehicles or other types of machines and equipment.

The brake unit 10 comprises a fixed housing or casing 14 adapted to be mounted on the frame of the vehicle or machine with which the brake unit is installed. The housing or casing 14 has opposite side portions 16 and 18 respectively presenting opposite annular friction or brake surfaces 20 and 22 surrounding and coaxial with the rotatable member or shaft 12.

A rotor member or wheel 24 is mounted on the shaft 12 and is formed with internal splines 26 or other suitable means cooperable with the shaft so that the rotor 24 is fixed for rotation with the shaft. Rotor discs 28 and 30 are disposed around the periphery of the rotor member 24 in axially spaced relationship with respect to each other and adjacent the friction surfaces 20 and 22 for cooperation therewith. The periphery of the rotor member 24 is formed with splines 32 for cooperative engagement with teeth on the inner margins of the rotor discs 28 and 30 so that the rotor discs are fixed for rotation with the rotor member 24 but at the same time are axially shiftable relative to the rotor member. The rotor discs may be of known construction and each preferably comprises a central metallic disc element 34 and annular bands 36 and 38 of friction material bonded or otherwise secured to opposite sides of the disc element 34.

Actuating discs 40 and 42 are disposed in opposing relationship between the rotor discs 28 and 30. The actuating discs are adapted to be rotated relative to each other in the manner described below and means is provided between the discs for axially shifting the actuating discs upon a relative rotation thereof. In the embodiment shown, this means comprises a plurality of ball elements 44 disposed in pairs of opposing and oppositely inclined cam seats 46 and 48 in the actuating discs 40 and 42. The arrangement is such that when the actuating discs are rotated relative to each other in one direction, the ball elements ride up on the cam surfaces 46 and 48 and force the actuating discs axially apart and thereby urge friction surfaces 50 and 52 of the actuating discs against the friction discs. At the same time the friction discs are axially shifted toward and clamped against the friction surfaces 20 and 22 of the housing or casing means. Upon reverse relative rotation of the actuating discs 40 and 42, the ball or cam elements 44 ride down on the lower portions of the cam surfaces 46 and 48 and permit the actuating discs and the rotor discs to shift axially sufficiently effectively to disengage the friction surfaces from each other and provide the desired running clearance between the friction surfaces.

The actuating discs 40 and 42 are supported for rotation relative to each other by pins or guide elements 54, 56, 58 and 60 extending between opposite sides of the housing or casing and engageable with circumferentially disposed bearing surfaces 62, 64, 66 and 68 on both of the actuating discs. In order to limit rotation of the actuating discs and transfer the braking torque from the actuating discs to the housing or casing, a torque pin 70 is mounted between opposite sides of the casing adjacent the periphery of the discs as shown in FIGS. 1 and 2. The actuating disc 40 has a lateral projection or ear 72 presenting an abutment surface 74 facing in one direction and engageable with one side of the torque pin 70 while the actuating disc 42 has another lateral projection or ear 76 presenting an abutment surface 78 facing in an opposite direction and engageable with an opposite side of the torque pin. The arrangement is such that when the rotor and shaft 12 are rotating in a clockwise direction as viewed in FIG. 1 and the brake is energized, the abutment surface 74 will be forced against the torque pin 70 while the actuating disc 42 rotates relative to the disc 40 for axially relatively shifting the disc and effecting the braking action as described above. On the other hand, when the rotor means rotates in a counter clockwise direction as viewed in FIG. 1 and the brake is energized, the lug 76 of the actuating disc 42 will be forced against the torque pin while the actuating disc 40 rotates to cause axial shifting of the disc.

In order to actuate the discs 40 and 42 and energize the brake structure, a fluid cylinder 80 is mounted on the fixed housing or casing between opposed generally upstanding ears 82 and 84 on the discs 40 and 42 respectively. Preferably the cylinder 80 and the ears 82 and 84 are located substantially diametrically opposite from the torque pin 70. Conduit means 86 is adapted to connect an intermediate portion of the cylinder 80 with a suitable source of hydraulic or other actuating fluid under pressure, and fluid actuated pistons 88 and 90 are disposed in opposite ends of the cylinder and project therefrom for engagement with the ears 82 and 84. Thus upon introduction of fluid under pressure into the cylinder 80, the pistons 88 and 90 are extended and the discs 40 and 42 are rotated relative to each other for energizing the brake.

In order to bias the actuating discs 40 and 42 toward their initial or retracted position and deenergize the brake unit when the pressure in the cylinder 80 is relieved, axially arranged tension springs 92 are connected between pairs of radially inwardly projecting fingers 94 and 96 at a plurality of locations spaced around the discs 40 and 42 as shown in FIGS. 1 and 2. In addition, tension springs 98 and 100 shown best in FIGS. 3, 4 and 5 are connected between the upstanding ears 82 and 84. These last mentioned springs have coiled central body portions and straight opposite end sections 102–104 and 106–108 respectively. In the embodiment shown, the end sections 102 and 106 are hooked around and engaged in a notch 110 in the ear 82 while the opposite end sections 104 and 108 are hooked around and engaged in a notch 112.

As previously indicated, a feature of the present invention contemplates novel means for compensating for wear of the friction surfaces and friction discs by adjusting the starting or retracted position of the actuating discs 40 and 42 so as to maintain running clearances between the friction discs and the adjacent surfaces engageable therewith within predetermined limits. This means is shown best in FIGS. 3–6 and comprises first and second screw elements 114 and 116. The screw element 114 has a straight shank section 118 having helical thread convolutions thereon of one hand and the screw element 18 has a similar straight shank section 120 with helical thread convolutions thereon of the opposite hand. The screw elements respectively include hooked end portions 122 and 124 extending through apertures 126 and 128 in the upstanding ears 82 and 84 of the actuating discs. As shown best in FIG. 5, the apertures 126 and 128 have a diameter greater than the diameter of the hooked end portions 122 and 124 of the screw elements for the purpose described below.

The threaded shank section 118 of the screw element 114 is assembled within an internally threaded nut element 130 and the screw element 116 is engaged with a nut element 132 having internal threads of an opposite hand from that of the threads of the nut 130. The nut elements are welded as at 134 or otherwise secured together so as to combine with the screw elements in providing a rigid but axially adjustable link between the ears of the actuating discs 42 and 44. The nut members 130 and 132 combine together to provide a radially extending flange 136 for a purpose described below.

In order to retain the hook-like end portions of the screw elements in assembled relationship with the ears of the actuating discs, suitable fastening means are provided. In the embodiment shown, cotter pins 138 and 140 extend through apertures in the end portion 122 of the screw element 114 at opposite sides of the ear 82. Similar cotter pins 142 and 144 extend through the end section 124 of the screw element 116 at opposite sides of the ear 84.

As previously indicated, the diameters of the screw elements 114 and 116 and of the apertures 126–128 are such that a clearance is provided between the screw elements and the walls of the aperture. The combined clearance between the screw elements 114 and 116 and the walls of their respective associated apertures corresponds to the total running clearance between the friction discs and the friction surfaces of the actuating discs and the housing engageable therewith. Thus when the brake unit is energized, the actuating discs are relatively rotated from a retracted position until the friction discs are clamped between the friction surfaces. This movement takes up the clearance between the screw element end sections 122 and 124 and the walls of their associated apertures so that as the friction surfaces of the discs wear away, a tension force is applied to the screw elements and their associated nut elements as the hydraulically operated pistons continue to urge the ears 82 and 84 of the actuating discs away from each other. The lead of the thread convolutions on the screw elements and cooperating nut elements is such that when this tension force is applied by the actuating cylinder and pistons, the nut elements 130 and 132, rotate as a unit relative to the screw elements for effectively lengthening the link between the ears 82 and 84 and permitting the brake to be fully energized.

Upon deenergizing the brake after the effective length of the link provided by the screw and nut elements has been adjusted and lengthened as described above, a compression force is applied to the screw elements and as a result of the action of the various springs tending to return the actuating discs toward their initial starting or retracted position. This compression force tends to cause the nut elements to be reversely rotated. However, it is to be noted that the springs 98 and 100 extend along and engage opposite sides of the nut elements 130 and 132 and particularly the radially projecting flange portion 136 thereof. The width of the ears 82 and 84 and the diameters of the springs 98 and 100 and the nut elements and particularly the flange portion thereof are correlated so that the springs are biased against the nut elements and provide a frictional drag which is sufficient to prevent reverse rotation of the nut elements so that the desired adjusted or increased length of the link means is maintained. As indicated the total force provided by the various springs is sufficient to overcome the resistance of the nut elements against reverse turning. On the other hand, the actuating force provided by the hydraulic cylinder and piston means is substantially greater than the force provided by the springs and is sufficient for overcoming the resistance of the nut elements to turning whereby to obtain the previously described adjustment.

While a preferred embodiment of the present invention has been shown and described herein, it is obvious that many structural details may be changed without departing from the spirit and scope of the appended claims.

The invention is claimed as follows:

1. A friction device comprising: first and second relatively movable members for energizing the friction device; activating means for relatively moving said members in one direction from a retracted position for energizing said friction device; first spring means mounted on a first side of said first and second members and interconnecting said first and second members for biasing said members for relative movement in a second direction toward the retracted position; second spring means mounted on a second side of said first and second members and interconnecting said first and second members for further biasing said members for relative movement in the second direction toward the retracted position; and wear compensation means connected to said first and second members, said wear compensation means being responsive to the relative movement of said members in the one direction from the retracted position for limiting return movement of said members in the second direction and thereby adjusting the retracted position to compensate for wear in the friction device, said wear compensation means including first and second screw elements each having the outer end portion thereof extending in opposite directions and respectively connected at said outer end portions to said first and second members and having thread convolutions of opposite hands, and nut means including first and second portions having internal thread convolutions of opposite hands respectively engaging said first and second screw elements with said outer end portions disposed to prevent binding action between the screw elements and the nut means, said nut means being rotatable relative to and axially adjustable along said screw elements in response to relative movement of said first and second members in the one direction, said first and second spring means having portions on opposite sides of said nut means biased into engagement therewith for restraining said nut means against reverse rotation as said first and second spring means urge said first and second members in the second direction toward the retracted position.

2. A friction device as set forth in claim 1 wherein: a first notch is formed in an outer edge portion of said first member and a second notch is formed in an outer edge portion of said second member, both said first and second spring means being in engagement with both said first and second notches to urge said first and second members in the second direction toward the retracted position, said wear compensation means being mounted intermediate said first and second notches to limit the motion of said first and second members under the influence of said first and second spring means.

References Cited

UNITED STATES PATENTS

| | | | |
|---|---|---|---|
| 2,563,759 | 8/1951 | Tiscornia et al. | 188—72 |
| 2,831,552 | 4/1958 | Kershner | 188—72 |
| 2,883,007 | 4/1959 | Klaue | 188—72 |
| 2,938,608 | 5/1960 | Kershner | 188—72 |

MILTON BUCHLER, *Primary Examiner.*

G. E. A. HALVOSA, *Assistant Examiner.*